United States Patent [19]

Park

[11] Patent Number: 5,309,236
[45] Date of Patent: May 3, 1994

[54] VIDEO SIGNAL PROCESSING CIRCUIT OF A BROADCASTING SYSTEM

[75] Inventor: Hyun J. Park, Kyungki, Rep. of Korea

[73] Assignee: Samsung Electronics Co., Ltd., Kyungki, Rep. of Korea

[21] Appl. No.: 956,338

[22] Filed: Oct. 5, 1992

[30] Foreign Application Priority Data

Oct. 8, 1991 [KR] Rep. of Korea ............ 91-17625

[51] Int. Cl.[5] .................. H04N 5/04; H04N 5/10
[52] U.S. Cl. .......................... 348/500; 348/530
[58] Field of Search ............. 358/148, 150, 153, 154, 358/11; H04N 5/04, 5/06, 5/08, 5/10, 11/20

[56] References Cited

U.S. PATENT DOCUMENTS

| | | | |
|---|---|---|---|
| 4,858,008 | 8/1989 | Sieben | 358/154 |
| 5,025,496 | 6/1991 | Canfield | 358/148 |
| 5,189,515 | 2/1993 | Chen | 358/150 |
| 5,191,434 | 3/1993 | Kim | 358/148 |

FOREIGN PATENT DOCUMENTS 0088990 5/1983 Japan.
0245870 10/1987 Japan.

Primary Examiner—James J. Groody
Assistant Examiner—Chris Grant
Attorney, Agent, or Firm—Sughrue, Mion, Zinn, Macpeak & Seas

[57] ABSTRACT

A single chip video signal processing circuit capable of performing a sync separation and odd/even field detection using an NTSC mode or a PAL mode video signal, the video signal processing circuit includes a sync signal separator for separating the input video signal into a horizontal sync signal and a composite sync signal, a vertical sync signal detector for detecting a vertical sync signal from the composite sync signal, a window pulse generator for generating a window pulse having a different width according to the selection of either the NTSC mode or the PAL mode by combining the detected vertical sync signal with the horizontal sync signal, an odd/even field detector for receiving the window pulse and the vertical sync signal and for detecting the number of pulses of the vertical sync signal within the window pulse interval, and a vertical blanking interval detector for counting a predetermined number of pulses of the horizontal sync signal, the window pulse being used as a RESET pulse for generating a vertical blanking pulse.

7 Claims, 5 Drawing Sheets

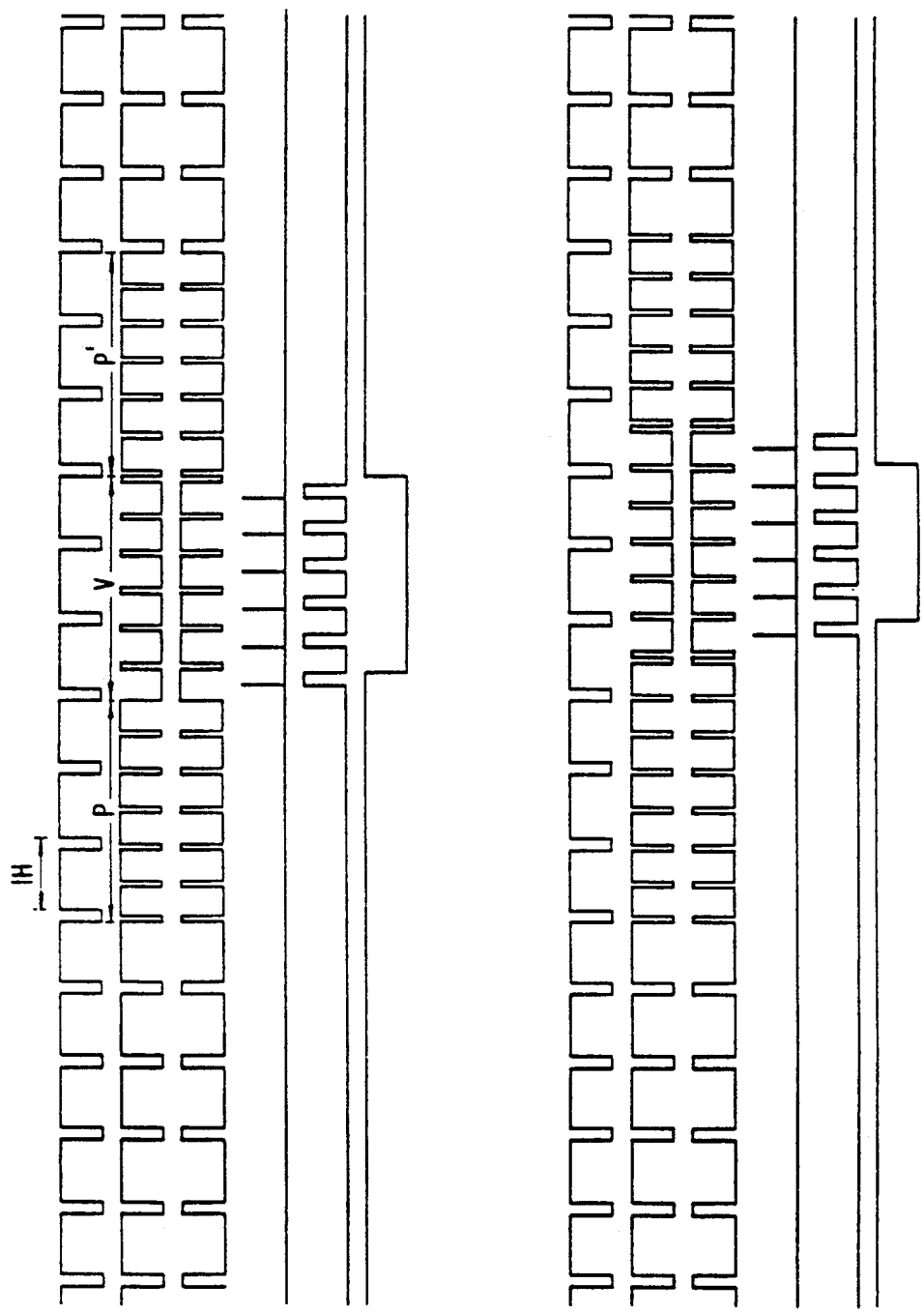

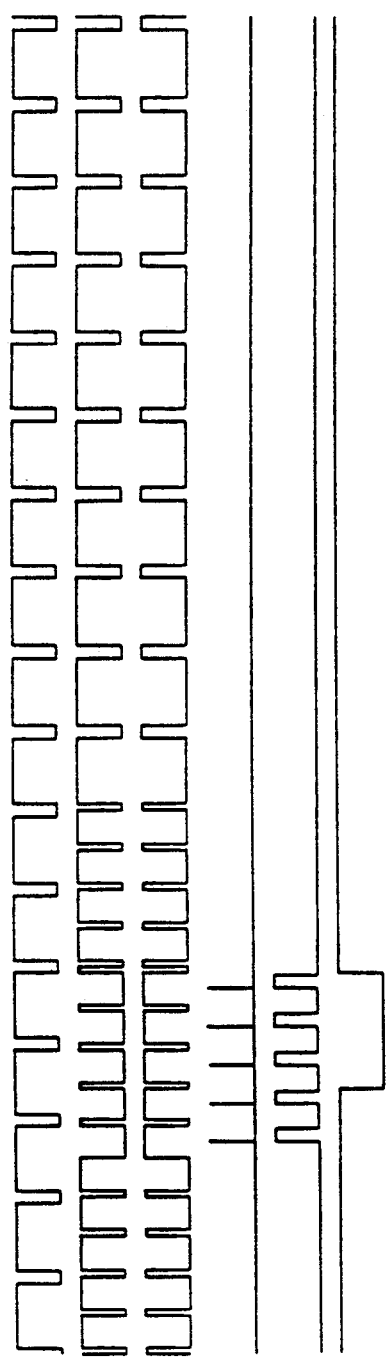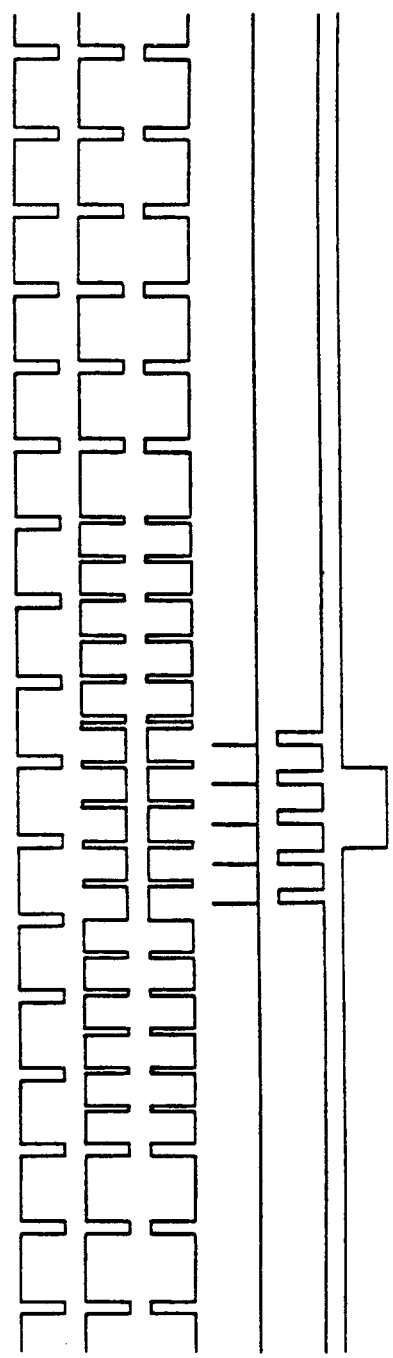

VIDEO SIGNAL PROCESSING CIRCUIT OF A BROADCASTING SYSTEM

FIELD OF THE INVENTION

The present invention relates to a video signal processing circuit capable of adapting to an NTSC (National Television System Committee) system and to a PAL (Phase Alternation Line) system, and more particularly, relates to a single chip video signal processing circuit for separating sync signals from a video signal of an NTSC system or a PAL system, and for detecting if the video signal is in an odd field or in an even field in order to generate an odd and even field detecting signal.

BACKGROUND OF THE INVENTION

Recently, broadcasting systems have been used which are able to convert an NTSC video signal into a PAL video signal, and vice versa. Such systems have been used in conformity with a trend towards broadcasting internationalization. However, the video signal processing systems which have been adapted for use with an NTSC system and a PAL system include separate sync separators for each broadcasting system. Accordingly, the circuitry of the system is rather complex. In addition, since detection of an odd and even field is processed using software employed in a microcomputer, it is difficult to obtain an exact output.

SUMMARY OF THE INVENTION

It is therefore an object of the present invention to provide a video signal processing circuit which overcomes the shortcomings of the existing sytems.

It is another object of the invention to provide a broadcasting system for separating sync signals from a video signal for use in a system adapted for use with NTSC and PAL broadcasting signals.

It is another object of the invention to provide a video signal processing circuit which can be manufactured with a single chip.

It is another object of the invention to provide a video signal processing circuit for detecting an odd field and an even field in a system adapted for use with both NTSC and PAL broadcasting signals.

To accomplish the above objects, there is provided, according to the invention, a video signal processing circuit of a broadcasting system for combined use in an NTSC mode and PAL mode. The processing circuit includes a sync signal separator for separating an input video signal into a horizontal sync signal and a composite sync signal, a vertical sync signal detector for receiving the composite sync signal and an external clock signal and for detecting a vertical sync signal from among the composite sync signal, a window pulse generator for combining the detected vertical sync signal with the horizontal sync signal and for generating a window pulse having a width which varies according to whether the NTSC mode or the PAL mode is selected, an odd/even field detector for receiving the window pulse and the vertical sync signal and for detecting the number of pulses of the vertical sync signal within the window pulse interval, and a vertical blanking interval detector for counting the horizontal sync signal by a predetermined number of pulses, and for using the window pulse as a RESET pulse for generating a vertical blanking pulse.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 3A to 3F are waveform diagrams showing an odd field of an NTSC mode and representing output waveforms of the respective elements shown in FIG. 2.

FIGS. 4A to 4F are waveform diagrams showing an even field of an NTSC mode and representing output waveforms of the respective elements shown in FIG. 2.

FIGS. 5A to 5F are waveform diagrams showing an odd field of a PAL mode and representing output waveforms of the respective elements shown in FIG. 2.

FIGS. 6A to 6F are waveform diagrams showing an even field of PAL mode and representing output waveforms of the respective elements shown in FIG. 2.

DETAILED DESCRIPTION OF THE PREFERRED EMBODIMENTS

A preferred embodiment of the present invention will be described below with reference to the drawings.

Figure 1:
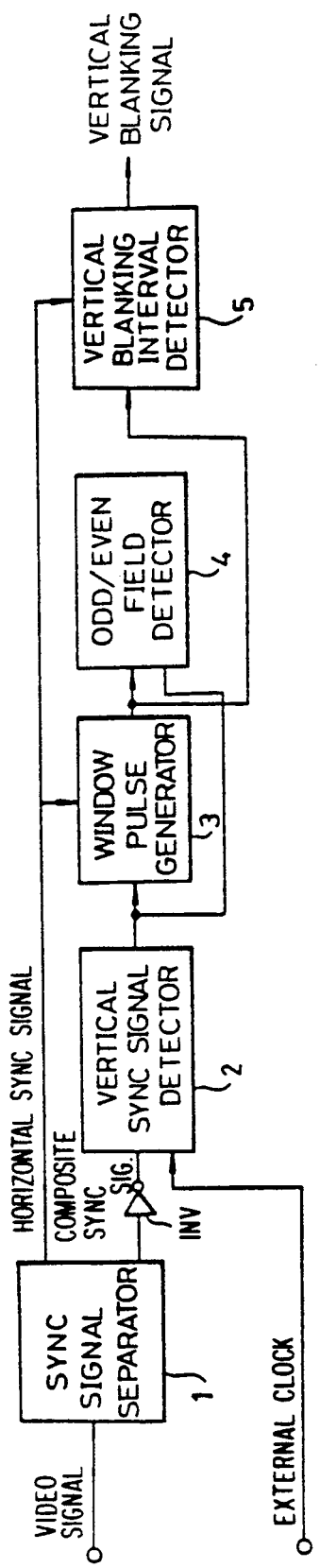
FIG. 1 is a block diagram showing an embodiment of a video signal processing circuit according to the present invention.

Referring to FIG. 1, a video signal processing circuit according to the present invention comprises a sync signal separator for separating an input video signal into a horizontal sync signal and a composite sync signal, a vertical sync signal separator 2 for detecting and counting only a vertical sync signal among the composite sync signal, a window pulse generator 3 for combining the horizontal sync signal and the vertical sync signal and for generating a window pulse which has a different start point and a different width according to whether an NTSC mode or a PAL mode has been selected, an odd/even field detector 4 for detecting an odd/even field of each of the respective modes according to a value of the detected vertical sync signal in the window pulse, and a vertical blanking interval detector 5 for counting the horizontal sync signal to a predetermined number of clock pulses, and setting a vertical blanking interval according to the counted value.

In FIG. 1, an inverter INV is provided for inverting the composite sync signal in order to detect the vertical sync signal. As shown in FIG. 1, inverter INV is connected between an output of sync signal separator 1 and an input of vertical sync signal detector 2.

Figure 2:
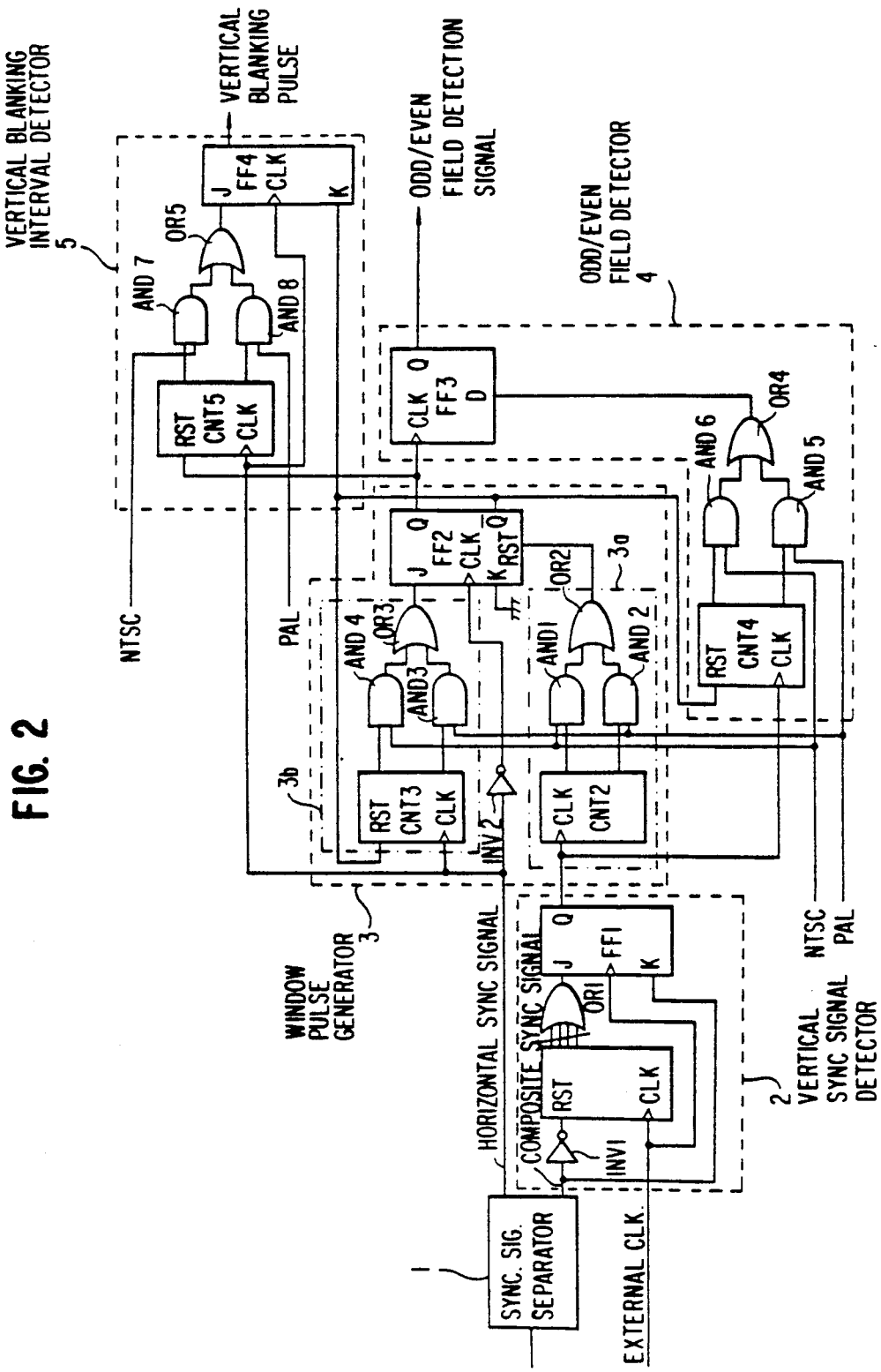
FIG. 2 is a detailed circuit diagram of the circuit shown in FIG. 1.

FIG. 2 shows a detailed circuit diagram of the circuit elements shown in FIG. 1, and will now be explained.

As discussed, sync signal separator 1 separates an input video signal into a horizontal sync signal and a composite sync signal. The sync signal separator 1 comprises a PLL (Phase-Locked-Loop) circuit for extracting a horizontal sync signal, a low-pass filter for extracting a composite sync signal, a clamp circuit and a comparator. The elements of sync signal separator 1 are well-known to those skilled in the art, and thus are not shown in FIG. 2. The composite sync signal output by sync signal separator 1 includes equalizing pulses and the vertical sync signal.

The vertical sync signal detector 2 comprises a counter CNT1 for counting pulses of the vertical sync signal. As shown in FIG. 2, an inverted composite sync signal is supplied to a reset terminal RST of counter CNT1. Counter CNT1 also receives an external clock signal having a width narrower than that of a high level of the vertical sync signal included in the inverted composite sync signal, and wider than that of a high level of the signal except for the vertical sync signal included in the inverted composite sync signal, an OR gate OR1 for logically summing the outputs of counter CNT1, and a J-K flip-flop FF1 for widening the output of OR gate OR1 by a predetermined width.

The window pulse generator 3 comprises a window pulse start point setter 3a and a window pulse end point setter 3b.

The window pulse start point setter 3a includes a counter CNT2 for counting pulses of the output signal from vertical sync signal detector 2, an AND gate AND1 for logically multiplying a first clock signal of the output signal of vertical sync signal detector 2 with an NTSC mode signal, an AND gate AND2 for logically multiplying a second clock signal of the output signal of vertical sync signal detector 2 with a PAL mode signal, and an OR gate OR2 for logically summing the outputs from AND gates AND1 and AND2.

The window pulse end point setter 3b includes a counter CNT3 for counting the horizontal sync signal separated in sync signal separator 1, an AND gate AND3 for logically multiplying a first clock signal of the counted horizontal sync signal with the PAL mode signal, an AND gate AND4 for logically multiplying a second clock signal of the counted horizontal sync signal with the NTSC mode signal, and an OR gate OR3 for logically summing the outputs of AND gates AND3 and AND4.

The window pulse generator 3 further includes a J-K flip-flop FF2 for generating a window pulse according to each of the respective modes. As shown in FIG. 2, the output signal of window pulse end point setter 3b is supplied to terminal J of flip-flop FF2, an inverted signal of the horizontal sync signal (inverted by inverter INV2) is supplied to a clock terminal CLK, a terminal K is grounded, and the output of window pulse start point setter 3a is supplied to a reset terminal RST of flip-flop FF2.

The odd/even field detector 4 comprises a counter CNT4 for counting a number of clocks included in the output signal of vertical sync signal detector 2 within the window pulse interval provided by window pulse generator 3. As shown in FIG. 2, the output signal of vertical sync signal detector 2 is supplied to a clock terminal CLK, and the output signal from output terminal Q' of flip-flop FF2 in window pulse generator 3 is supplied to a reset terminal RST of flip-flop FF2. The odd/even field detector 4 further comprises an AND gate AND5 for logically multiplying a signal representing that a detected output value of counter CNT4 is three (3) with the PAL mode signal, an AND gate AND6 for logically multiplying a signal representing that a detected output value of counter CNT4 is five (5) with the NTSC mode signal, an OR gate OR4 for logically summing the outputs of AND gates AND5 and AND6, and a flip-flop FF3. The flip-flop FF3 generates a low signal for an odd field and generates a high signal for an even field. The output signal from output terminal Q of flip-flop FF2 in window pulse generator 3 is supplied to a clock terminal CLK of flip-flop FF3, and the output signal of OR gate OR4 is supplied to a data terminal D of flip-flop FF3. The output Q of flip-flop FF3 provides an odd/even detection signal.

The vertical blanking interval detector 5 comprises a counter CNT5 for counting a number of clocks included in the horizontal sync signal. Specifically, the horizontal sync signal separated in sync signal separator 1 is supplied to a clock terminal CLK of counter CNT5, and the output signal from the output terminal Q of flip-flop FF2 in window pulse generator 3 is supplied to a reset terminal RST. The vertical blanking interval detector 5 further comprises an AND gate AND7 for logically multiplying a signal representing that the counted value is fifteen (15) with the NTSC mode signal, an AND gate AND8 for logically multiplying a signal representing that the counted value is seventeen (17) with the PAL mode signal, an OR gate OR5 for logically summing the outputs of AND gates AND7 and AND8, and a J-K flip-flop FF4 for generating a vertical blanking pulse. The output signal of OR gate OR5 is supplied to a terminal J of flip-flop FF4, the horizontal sync signal separated in sync signal separator 1 from the video signal is supplied to a clock terminal CLK, and the output signal from output terminal Q' of flip-flop FF2 is supplied to a terminal K of flip-flop FF4.

As indicated above, the counted value for counter CNT5 is fifteen or seventeen. However, these counted values are simply predetermined values set for convenience of explanation. The set values are due to the vertical blanking interval being located between the pre-equalizing signal and the twenty-first horizontal sync signal (21H) for the NTSC mode, and being located between the pre-equalizing signal and the twenty-second horizontal sync signal (22H) for the PAL mode. However, the vertical blanking interval may be different from those discussed above depending on a particular country's format.

Figure 7:
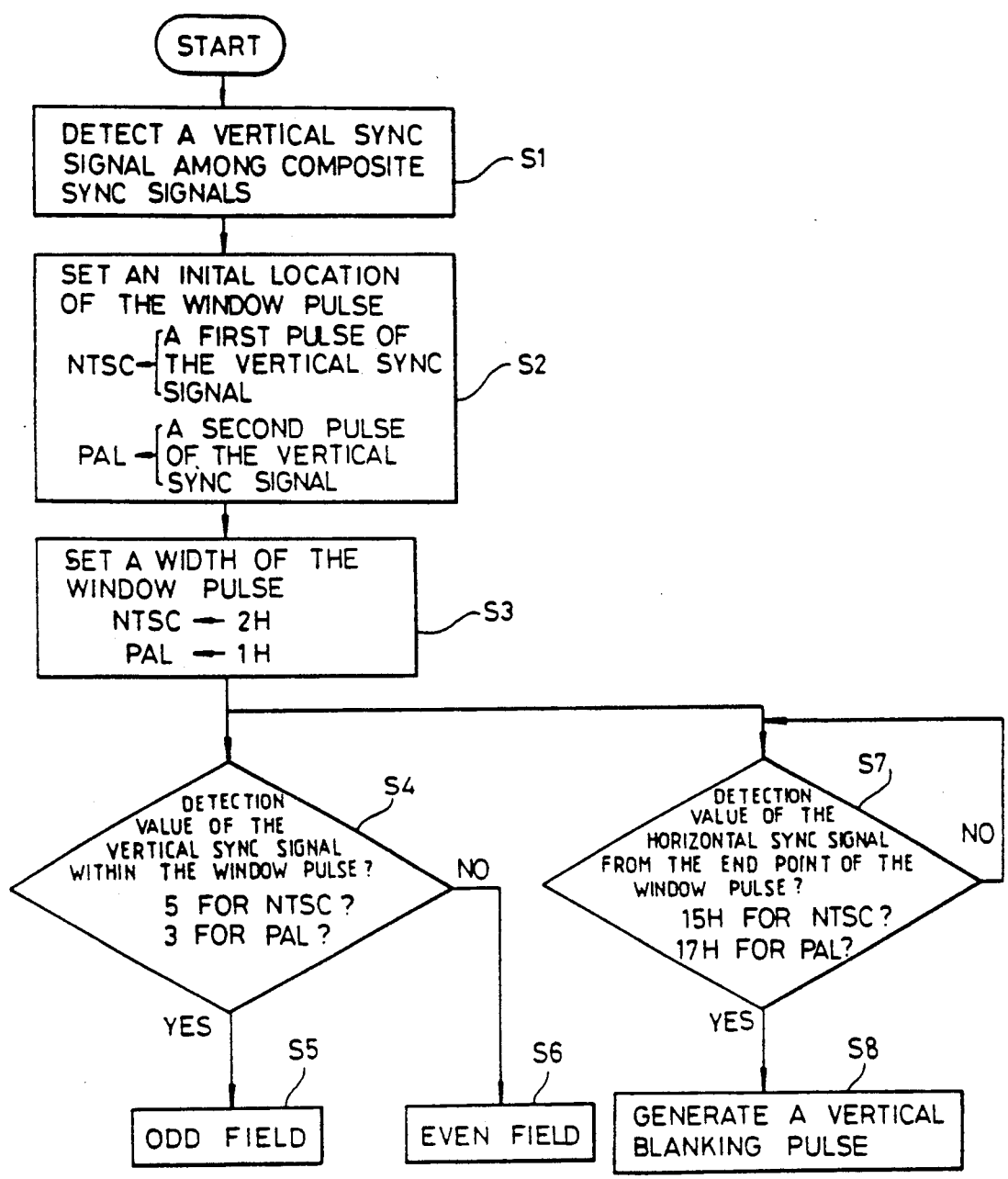
FIG. 7 is a flowchart diagram showing an operation of the video signal processing circuit according to the present invention.

FIGS. 3A through 3F, FIGS. 4A through 4F, FIGS. 5A through 5F and FIGS. 6A through 6F are waveform diagrams for an odd field or an even field according to the NTSC mode or the PAL mode. FIG. 7 is a flow-chart diagram for explaining the operation of the video signal processing circuit according to the present invention.

The operation of the present invention will now be described.

In FIGS. 1 and 2, after the input video signal passes through sync signal separator 1, the input video signal is separated into the horizontal sync signal such as one of the waveforms shown in FIGS. 3A, 4A, 5A and 6A, and into the composite sync signal such as one of the waveforms shown in FIGS. 3B, 4B, 5B and 6B. FIGS. 3A through 3F represent odd field signals of the NTSC mode. FIGS. 4A through 4F represent even field signals of the NTSC mode. FIGS. 5A through 5F represent odd field signals of the PAL mode, and FIGS. 6A through 6F represent even field signals of the PAL mode. The composite sync signal comprises the pre-equalizing signals which are shown as a portion P in FIG. 3B, the vertical sync signals shown as a portion V and the post-equalizing signals shown as a portion P'. As shown in the drawings, the difference between the odd field and even field in the horizontal sync signal and the composite sync signal is 0.5 H, where "H" is a period of time of a horizontal sync signal. This difference is further explained below.

To separate the vertical sync signal from the composite sync signal, the composite sync signal is inverted using inverter INV1 (as shown in FIGS. 3C, 4C, 5C and 6C). The reason for using the inverted vertical sync signal is because the low interval sync signal (portion V) is wider in pulse width than that of other signals. The inverted composite sync signal is supplied to reset terminal RST of counter CNT1 and the external clock which is capable of being counted only in a high interval of the inverted vertical sync signal is supplied to clock terminal CLK of counter CNT1. Accordingly, counter CNT1 counts high signals of the vertical sync signal. At this time, only the vertical sync signal is counted. Then, the counted vertical sync signal passes through OR gate OR1, thereby resulting in one of the waveforms shown in FIGS. 3D, 4D, 5D and 6D.

As shown in FIGS. 3D, 4D, 5D and 6D, six pulses of high levels for an NTSC mode are generated and five pulses of high level are generated for a PAL mode. Referring to FIGS. 2 and 7, the vertical sync signal passing through OR gate OR1 is applied to flip-flop FF1 to form a usable pulse. Specifically, flip-flop FF1 serves to widen the width of the high level pulses to a predetermined width as shown in FIGS. 3E, 4E, 5E or 6E (step S1 of FIG. 7). At this time, when the NTSC mode is selected in window pulse generator 3, a first vertical sync signal is detected in window pulse start point setter 3a (step S2). Then, two pulses of the horizontal sync signal are counted by window pulse end point setter 3b, thereby setting a width of the window pulse (step S3). Accordingly, the vertical sync signal is separated. That is, as shown in FIG. 3F, the window pulse proceeds in a high state until a first vertical sync signal is detected. After the first vertical sync signal is detected (i.e., trailing edge thereof), the window pulse becomes a low state for two pulses of the horizontal sync signal, and then the window pulse becomes a high state. Accordingly, in the case of the NTSC mode, the waveform of the odd field of the window pulse becomes a low state for 2.5 H. FIG. 4F represents the even field of the NTSC mode in which the waveform of the window pulse becomes a low state for 2 H.

On the other hand, when the PAL mode is selected in window pulse generator 3, a second vertical sync signal is detected (i.e., trailing edge thereof) in window pulse start point setter 3a (step S2). Then, a single pulse of the horizontal sync signal is counted by window pulse end point setter 3b, thereby setting a width of the window pulse (step S3). That is, as shown in FIG. 5F, the window pulse proceeds in a high state until the trailing edge of a second vertical sync signal is detected. After the second vertical sync signal is detected, the window pulse becomes a low state for a single pulse of the horizontal sync pulse, and then the window pulse becomes a high state. Accordingly, in the case of the PAL mode, the waveform of the odd field of the window pulse becomes a low state for 1.5 H. FIG. 6F represents the even field of the PAL mode in which the waveform of the window pulse becomes a low state for 1 H.

The reason why the widths of the separated vertical sync signals for the NTSC mode and the PAL mode are different from each other in the odd field and the even field is that positive or rising edges of the horizontal sync signal are counted after the vertical sync signal is detected. Accordingly, the difference between the odd field and the even field in the horizontal sync signal and the composite sync signal results in the difference of 0.5 H. Using this difference, odd/even field detector 4 is able to detect the odd field and the even field. That is, by using the waveform of the window pulse, the detected value of the vertical sync signal is counted by counter CNT4 to detect the odd and even fields (steps S4 through S6). In the case of the odd field of the NTSC mode, as shown in FIGS. 3E and 3F, the detected value of the vertical sync signal is five within the low level of the window pulse. Accordingly, the output of counter CNT4 is applied to flip-flop FF3 through AND gate AND6 and OR gate OR4, so as to output a high state. In the case of the even field of the NTSC mode, as shown in FIGS. 4E and 4F, the detected value of the vertical sync signal is four within the low level of the window pulse, so as to output a low state in flip-flop FF3.

In the case of the odd field of the PAL mode, as shown in FIGS. 5E and 5F, the detected value of the vertical sync signal is three within the low level of the window pulse. Accordingly, the output of counter CNT4 is applied to the flip-flop FF3 through AND gate AND5 and OR gate OR4, so as to output a high state. In the case of the even field of the PAL mode, as shown in FIGS. 6E and 6F, the detected value of the vertical sync signal is two within the low level of the window pulse, so as to output a low state in flip-flop FF3.

The vertical blanking interval detector 5 detects an interval where the picture does not appear on the screen among the video signal. As described above, in the present invention, the vertical blanking interval is formed from the pre-equalizing signal to the 21st H in the case of the NTSC mode, while the vertical blanking signal is formed from the pre-equalizing signal to the 22nd H in the case of the PAL mode (steps S7 and S8). In the case of the odd field of the NTSC mode, the window pulse waveform shown in FIG. 3F is supplied to RESET terminal RST of counter CNT5 from flip-flop FF2, thereby counting the horizontal sync signal. The end point of the low level of the window pulse waveform is formed after 6 H lapse within the vertical blanking interval. Thus, counter CNT5 counts the horizontal sync signal for 15 H periods to reach the 21st H. After counting the horizontal sync signal for 15 H periods, the vertical blanking pulse is generated through AND gate AND7, OR gate OR5 and flip-flop FF4.

In the case of the even field of the NTSC mode, the end point of the low level of the window pulse waveform shown in FIG. 4F is formed after 5.5 H lapse within the vertical blanking interval. Thus, counter CNT5 counts the horizontal sync signal for 15 H periods to reach the 20.5th H. The reason why the vertical blanking interval is composed of 20.5 H is because the scanning start time is started from the center of the picture screen.

In the case of the odd field of the PAL mode, the window pulse waveform shown in FIG. 5F is supplied to RESET terminal RST of counter CNT5 from flip-flop FF2, thereby counting the horizontal sync signal. The end point of the low level of the window pulse waveform is formed after 5 H lapse within the vertical blanking interval. Thus, counter CNT5 counts the horizontal sync signal for 17 H periods, to reach the 22nd H. After counting the 17 H periods, the vertical blanking pulse is generated through AND gate AND8, OR gate OR5 and flip-flop FF4. In the case of the even field of the PAL mode, the end point of the low level of the window pulse waveform shown in FIG. 6F is formed at the time of 4.5 H lapse within the vertical blanking interval. Thus, 17 H periods should be counted to reach the 21.5th H. The reason why the vertical blanking interval is composed of 21.5 H is because the scanning start time is started from the center of the picture screen.

As described above, the present invention separates the horizontal sync signal and the composite sync signal from the NTSC mode or the PAL mode video signal, separates the vertical sync signal from the composite sync signal, generates the window pulse using the separated vertical sync signal and the separated horizontal sync signal, and detects the number of pulses within the window pulse interval, thereby detecting the odd and even field. In addition, by detecting the number of pulses of the horizontal sync signal from the end point of the window pulse, the vertical blanking interval can be simply formed so that separation of the sync signal from the NTSC or PAL mode video signal can be realized using only a single chip. Also, detection of the odd and even fields can be realized by simple hardware. Accordingly, the present invention can be applied to digital video processing apparatuses which perform such functions as a digital still, slow, strobe, zoom and picture-in-picture (PIP), etc., by using a vertical sync signal, and therefore the degree of industrial use is expected to be very high.

Also, the present invention can be applied when the broadcasting mode is converted. For example, when the even field of the NTSC signal is stored in memory, and then the stored value is loaded on the even field of the PAL signal to be converted into the PAL mode. In view of the sync signal, there are only two types of video signal such as the NTSC and PAL modes, thereby enabling the sync signal separation of the whole broadcasting modes.

What is claimed is:

1. A video signal processing circuit of a broadcasting system for use in an NTSC mode and a PAL mode, the processing circuit comprising:
   a sync signal separator for separating an input video signal into a horizontal sync signal and a composite sync signal;
   a vertical sync signal detector, coupled to receive the separated composite sync signal and to receive an external clock signal, for detecting a vertical sync signal from the separated composite sync signal;
   a window pulse generator for combining the detected vertical sync signal with the separated horizontal sync signal, and for generating a window pulse having a width depending on whether one of the NTSC mode and the PAL mode is selected;
   an odd/even field detector for receiving the generated window pulse and the detected vertical sync signal, and for detecting a number of pulses of the vertical sync signal within an interval of the generated window pulse; and
   a vertical blanking interval detector for counting a predetermined number of pulses of the separated horizontal sync signal, said vertical blanking interval detector using the generated window pulse as a RESET pulse for generating a vertical blanking pulse.

2. The video signal processing circuit as claimed in claim 1, wherein said vertical sync signal detector comprises:
   an inverter for inverting the separated composite sync signal;
   a counter for counting vertical sync signals among the inverted composite sync signal;
   a logic gate for logically summing the counted vertical sync signals; and
   a flip-flop for changing the logically summing signal into a pulse having a predetermined width.

3. The video signal processing circuit as claimed in claim 1, wherein said window pulse generator comprises:
   a window pulse start point setter for setting a starting point of a window pulse, said window pulse start point setter being operable, in an NTSC mode, for starting the window pulse from a first pulse of the vertical sync signal, and being operable, in a PAL mode, for starting the window pulse from a second pulse of the vertical sync signal;
   a window pulse end point setter for setting an end point of the window pulse, said window pulse end point setter being operable, in the NTSC mode, for ending the window pulse after two horizontal sync signal pulse intervals, and being operable, in the PAL mode, for ending the window pulse after one horizontal sync signal pulse interval; and
   a flip-flop for receiving the set starting point of the window pulse and the set end point of the window pulse, and for generating a window pulse.

4. The video signal processing circuit as claimed in claim 3, wherein said window pulse start point setter comprises:
   a counter for counting the vertical sync signals; and
   a logic gate for detecting if the counted value of said counter is a predetermined value.

5. The video signal processing circuit as claimed in claim 3, wherein said window pulse end point setter comprises:
   a counter for counting the horizontal sync signals; and
   a logic gate for detecting if the counted value of said counter is a predetermined value.

6. The video signal processing circuit as claimed in claim wherein said odd/even field detector comprises:
   a counter for counting the vertical sync signal from the window pulse start point;
   a logic gate for detecting whether the counted value is a predetermined value; and
   a flip-flop for generating a pulse which represents one of the odd field and the even field according to the detected counted value.

7. The video signal processing circuit as claimed in claim 1, wherein said vertical blanking interval detector comprises:
   a counter for counting the horizontal sync signal from an end point of the window pulse;
   a logic gate for detecting whether the counted value is a predetermined value; and
   a flip-flop for generating a vertical blanking pulse in accordance with the detected counted value.

* * * * *